(12) United States Patent
Arnold et al.

(10) Patent No.: US 10,218,221 B2
(45) Date of Patent: Feb. 26, 2019

(54) WIRELESS POWER TRANSFER USING ONE OR MORE ROTATING MAGNETS IN A RECEIVER

(71) Applicant: University of Florida Research Foundation, Inc., Gainesville, FL (US)

(72) Inventors: David P. Arnold, Gainesville, FL (US); Alexandra Garraud, Gainesville, FL (US); Nicolas Garraud, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 24 days.

(21) Appl. No.: 15/326,571

(22) PCT Filed: Jul. 7, 2015

(86) PCT No.: PCT/US2015/039343
§ 371 (c)(1),
(2) Date: Jan. 16, 2017

(87) PCT Pub. No.: WO2016/010772
PCT Pub. Date: Jan. 21, 2016

(65) Prior Publication Data
US 2018/0159368 A1    Jun. 7, 2018

Related U.S. Application Data

(60) Provisional application No. 62/025,578, filed on Jul. 17, 2014.

(51) Int. Cl.
*H02J 50/10* (2016.01)
*H02J 7/02* (2016.01)
(Continued)

(52) U.S. Cl.
CPC ............ *H02J 50/10* (2016.02); *H02K 7/1807* (2013.01); *H01F 38/14* (2013.01); *H02J 50/40* (2016.02)

(58) Field of Classification Search
CPC ....................................................... H02J 7/025
(Continued)

(56) References Cited

U.S. PATENT DOCUMENTS 6,798,090 B2    9/2004  Cheung et al.
7,687,941 B2    3/2010  Raghuprasad
(Continued)

FOREIGN PATENT DOCUMENTS

EP    2720383 A2    4/2014
WO    2016010772 A2    1/2016

OTHER PUBLICATIONS

International Search Report for PCT/US2015/039343 dated Dec. 29, 2015.

*Primary Examiner* — Edward Tso
*Assistant Examiner* — Ahmed H Omar
(74) *Attorney, Agent, or Firm* — Thomas | Horstemeyer, LLP

(57) ABSTRACT

The present disclosure is directed towards wireless power transfer using one or more rotating magnets in a receiver. An exemplary embodiment provides for a system comprising a transmitter that generates a dynamic magnetic field and a receiver comprising a magnet and a coil. In operation, the magnet rotates in response to the dynamic magnetic field and induces a voltage across the coil.

33 Claims, 15 Drawing Sheets

(51) Int. Cl.
  *H02K 7/18* (2006.01)
  *H01F 38/14* (2006.01)
  *H02J 50/40* (2016.01)

(58) Field of Classification Search
  USPC .......................................................... 320/108
  See application file for complete search history.

(56) References Cited

U.S. PATENT DOCUMENTS

| | | |
|---|---|---|
| 7,989,986 B2 | 8/2011 | Baarman et al. |
| 13,558,661 | 10/2013 | Zeine |
| 13,614,526 | 12/2013 | Cook et al. |
| 2008/0116847 A1 | 5/2008 | Loke et al. |
| 2010/0225174 A1 | 9/2010 | Jiang |
| 2011/0304220 A1* | 12/2011 | Whitehead .............. H01F 21/08 307/104 |
| 2012/0229140 A1 | 9/2012 | Shimokawa |
| 2012/0235636 A1 | 9/2012 | Partovi |
| 2012/0280650 A1 | 11/2012 | Kim et al. |
| 2013/0069625 A1 | 3/2013 | Gilchrist et al. |
| 2013/0123026 A1 | 5/2013 | Purdy |
| 2013/0241309 A1 | 9/2013 | Arnold et al. |

\* cited by examiner

WIRELESS POWER TRANSFER USING ONE OR MORE ROTATING MAGNETS IN A RECEIVER

CROSS-REFERENCE TO RELATED APPLICATION

This application is the 35 U.S.C. § 371 national stage application of PCT Application No. PCT/US2015/039343, filed Jul. 7, 2015, where the PCT Application claims priority to U.S. provisional application entitled, "Wireless Power Transfer Using One or More Rotating Magnets in a Receiver," having Ser. No. 62/025,578, filed Jul. 17, 2014, both of which are herein incorporated by reference in their entireties.

STATEMENT REGARDING FEDERALLY SPONSORED RESEARCH OR DEVELOPMENT

This invention was made with government support under Subcontract No. GTS-S-13-226, awarded by the U.S. Army and administered through General Technical Services, LLC. The government has certain rights in the invention.

TECHNICAL FIELD

The present disclosure is generally related to wireless power transmission.

BACKGROUND

Wireless power transmission has received an increasing interest over the past years with the expanding market of mobile devices, wearable electronics, and wireless sensor nodes. Wireless power transmission has been most widely studied using electromagnetic coupling between two coils, referred as inductive wireless power transmission. In this approach, a transmitter coil produces an alternating magnetic field that directly induces a voltage and current in a receiver coil placed at some distance away. In certain embodiments of inductive wireless power transmission, electrical resonance is used in the transmitter coil and/or receiver coil.

SUMMARY

Embodiments of the present disclosure provide a system and method for wireless power transfer using one or more rotating magnets in a receiver.

An embodiment of the present disclosure provides for a system comprising a transmitter that generates a dynamic magnetic field and a receiver comprising a magnet and a coil. In operation, the magnet rotates in response to the dynamic magnetic field and induces a voltage across the coil.

An embodiment of the present disclosure further provides for a method comprising positioning a receiver in a dynamic magnetic field that is generated by a transmitter; rotating a magnet in the receiver responsive to the dynamic magnetic field; and generating a voltage across a coil in the receiver in response to the rotating magnet.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
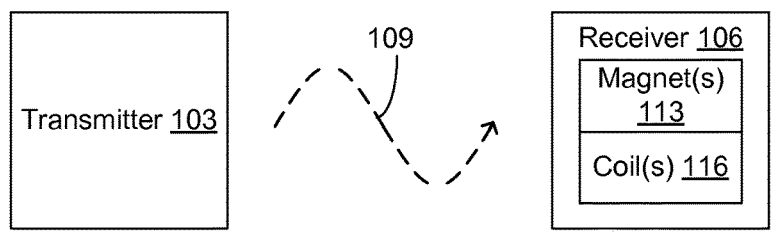
FIG. 1 is a block diagram of a power transfer environment according to various embodiments of the present disclosure.

The present disclosure is directed towards wireless power transfer using one or more rotating magnets in a receiver. With reference to FIG. 1, shown is a power transfer environment 100 according to various embodiments. The power transfer environment 100 in the embodiment shown in FIG. 1 includes a transmitter 103 that transfers power to a receiver 106. In some embodiments, multiple transmitters 103 may transfer power to the receiver 106. In other embodiments, the transmitter 103 may transfer power to multiple receivers 106. Even further, multiple transmitters 103 may transfer power to multiple receivers 106 in accordance with various embodiments of the present disclosure.

The transmitter 103 generates one or more dynamic magnetic fields 109. The dynamic magnetic field 109 may be sinusoidal or have any other suitable waveform. Such a sinusoidal dynamic magnetic field 109 may operate at one or more predefined frequencies. In some embodiments, the frequency of the dynamic magnetic field 109 may be constant. As a non-limiting example, the dynamic magnetic field 109 may have a frequency from about 1 Hz to about 10 kHz. Such a relatively low frequency may facilitate the dynamic magnetic field 109 passing through objects that would otherwise attenuate the dynamic magnetic field 109 if the frequency were higher.

In some embodiments, the frequency of the dynamic magnetic field 109 may be constant for a period of time and increase or decrease periodically. For example, the frequency of the dynamic magnetic field 109 may be periodically ramped down and then ramped back up to a predefined frequency. Such ramping down and up of the frequency may facilitate the transfer of power from the transmitter 103 to an additional receiver 106 when the additional receiver 106 is initially exposed to the dynamic magnetic field 109 in order to "start-up" the power transfer process.

The transmitter 103 may generate the dynamic magnetic field 109 in various ways. For example, the transmitter 103 may comprise one or more transmitter coils (not shown) that generate the dynamic magnetic field 109 in response to one or more time-varying input currents. In some embodiments, the coils may move (e.g., rotate) in order to generate the dynamic magnetic field 109. Such a transmitter coil may be embodied in the form of a multi-turn coil, a solenoid, a figure-eight coil, and/or any other suitable type of transmitter coil. In some embodiments, soft magnetic materials may be used to guide, concentrate, or amplify the magnetic field from the coil.

Additionally or alternatively, the transmitter 103 may comprise one or more transmitter magnets that are used to generate the dynamic magnetic field 109. Such transmitter magnets may be embodied in the form of a permanent magnet (also known in the state of the art as hard magnet or bar magnet) and/or an electromagnet (a coil with a soft magnetic core) and may comprise any suitable number of magnetic poles. To generate the dynamic magnetic field 109, the transmitter 103 may also adjust the position of the one or more transmitter magnets by, for example, rotating the one or more transmitter magnets relative to other components of the transmitter 103.

The receiver 106 is a device that is configured to receive power transferred by the transmitter 103. Various embodiments of the present disclosure facilitate transfer of power from the transmitter 103 to the receiver 106 irrespective of the relative orientation or movement between the transmitter 103 and the receiver 106. In this regard, power may be transferred from the transmitter 103 to the receiver 106 even when the receiver 106 is displaced and/or rotated relative to the transmitter 103. In some embodiments, the distance between the transmitter 103 and the receiver 106 may range from about 1 cm to about 1 m. It is understood that other distances between the transmitter 103 and the receiver 106 are within the scope of the present disclosure.

The receiver 106 comprises one or more magnets 113, one or more coils 116 (e.g., copper wire), and potentially other components. The magnet 113 is a permanent magnet (i.e., a hard magnet or a bar magnet). The one or more magnets 113 may be exposed to the dynamic magnetic field 109 that is generated by the transmitter 103. In response to the dynamic magnetic field 109, the one or more magnets 113 of the receiver 106 may rotate relative to the one or more coils 116 and/or other components of the receiver 106. The rotation of a magnet 113 relative to a coil 116 induces a voltage across the coil 116. The one or more coils 116 may be electrically coupled to one or more loads (not shown). Such a load may include, but is not limited to, an AC/DC convertor, a battery, and/or any other component that is suitable for being coupled to the coil 116. In this way, power may be wirelessly transferred from the transmitter 103 to the receiver 106 and then to one or more loads.

Figure 2:
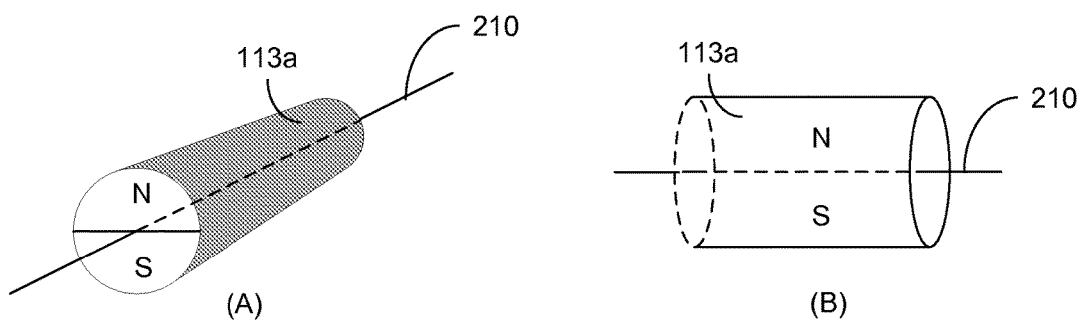
FIGS. 2-3 are diagrams of perspective views of magnets that may be used in a receiver of the power transfer environment of FIG. 1 in accordance with embodiments of the present disclosure.

With reference to FIG. 2, shown is an example of a magnet 113a that may be used in the receiver 106. As such, plot A of FIG. 2 provides a perspective view and plot B provides a side view of an embodiment of the magnet 113a. The magnet 113a shown is, but not limited to being, cylindrical and may comprise any suitable number of poles. For example, the magnet 113a may comprise one north pole and one south pole associated with respective longitudinal halves of the magnet 113a, as shown in FIG. 2.

When exposed to a dynamic magnetic field 109, the magnet 113a rotates about an axis. In one embodiment, a physical axle 210 guiding the magnet rotation about the axis is featured. The axle 210 may be disposed through the longitudinal axis of the cylindrical magnet 113a, and the magnet 113a may rotate in conjunction with the axle 210 about the axis defined by the axle 210. Alternatively, the axle 210 may be fixed in the receiver 106a, and the magnet 113a may rotate around the axle 210. The axle 210 may be supported within the receiver 106a in any suitable way. A shape of the magnet 113, when guided by the physical axle 210, may be any shape in various embodiments, including having a square shape, as an example.

Figure 3:
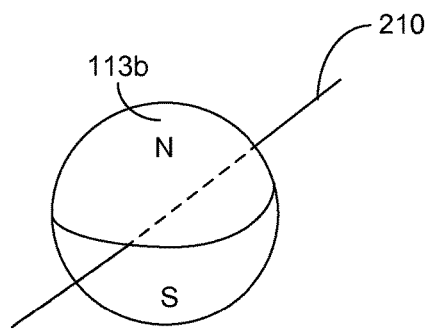

With reference to FIG. 3, shown is another example of a magnet 113b that may be used in the receiver 106. The magnet 113b is spherical and may comprise any suitable number of poles. For example, the magnet 113b may comprise a north pole and a south pole associated with respective hemispheres of the magnet 113b, as shown in FIG. 3.

When exposed to a dynamic magnetic field 109, the magnet 113b rotates about an axis defined by the axle 210. To this end, the axle 210 may extend through the center of the magnet 113b, as shown in FIG. 3. In some embodiments, the magnet 113b may rotate in conjunction with the axle 210. In other embodiments, the magnet 113b may rotate around the axle 210.

Figure 4:
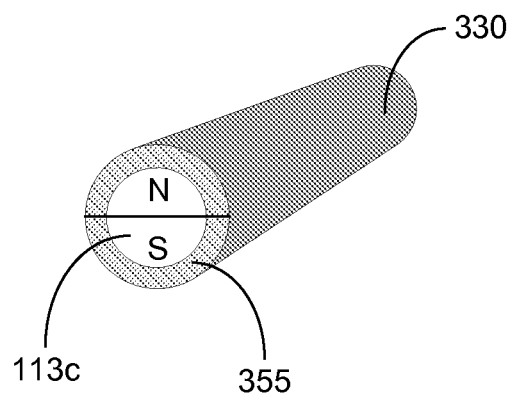
FIGS. 4-5 are diagrams of a cross section view showing a magnet, a magnet casing, and a fluid that may be in the receiver of FIG. 1 in accordance with embodiments of the present disclosure.

With reference to FIG. 4, shown is a cross section view showing a magnet 113c, a magnet casing 330, and a fluid 355 that may be in the receiver 106 according to various embodiments. As such, guidance of the magnet rotation is realized by the external surface of the magnet 113 in the magnet casing 330 without need for a physical axle. Further, in some embodiments, a lubricant may be utilized to facilitate magnet rotation within the magnet casing 113. The magnet 113c and the magnet casing 330 shown in FIG. 4 are, but not limited to being, cylindrical. For example, when the magnet 113c is guided in its magnetic casing 330, the shape can be, but not limited to, a cuboid (rectangular prism) or a solid of revolution, such as an ovoid, and rotate around its main axis.

The magnet casing 330 contains the magnet 113c, the fluid 355, and/or other components. For example, the magnet casing 330 may comprise a tube formed of plastic and/or any other suitable material, including glass. The fluid 355 is optional in some embodiments. For example, the fluid 355 may comprise ferrofluid (e.g., magnetic particles suspended in a fluid), water, oil, a gas, and/or any other suitable substance that may facilitate the magnet 113c rotating within the magnet casing 330. The fluid 355 may fully fill or partially fill the cavity formed between the magnet 113c and the magnet casing 330. It is noted that the embodiment shown in FIG. 4 does not include an axle 210.

When the magnet 113c is exposed to the dynamic magnetic field 109, the magnet 113c may rotate within the magnet casing 330 about the longitudinal axis of the magnet 113c. The fluid 355 may act as a lubricant between the magnet 113c and the magnet casing 330, thereby facilitating the rotation of the magnet 113c.

Figure 5:
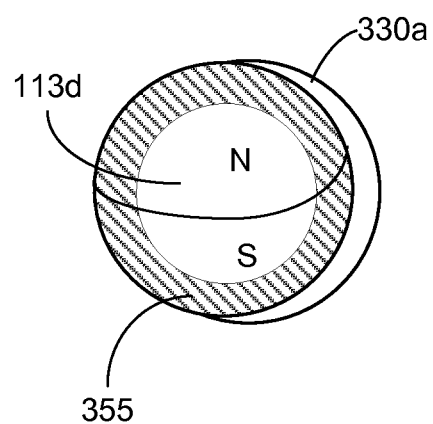

With reference to FIG. 5, shown is a cross section view showing a magnet 113d, another example of a magnet casing 330a, a fluid 355, and/or other components. The magnet 113d and the magnet casing 330a shown in FIG. 5 are spherical. It is noted that the embodiment shown in FIG. 5 does not include an axle 210.

When the magnet 113d is exposed to the dynamic magnetic field 109, the magnet 113d may rotate within the magnet casing 330a. Because both the magnet 113d and the magnet casing 330a are spherical, the magnet 113d is able to align and rotate in any direction in response to the dynamic magnetic field 109.

Figure 6A:
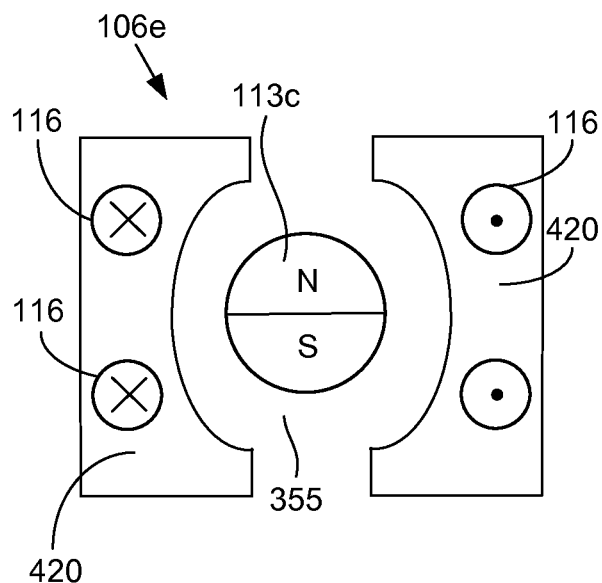
FIGS. 6A, 7A, 8A, 9A, 10A, and 11A are diagrams of a cross section view of a receiver including a coil support structure in accordance with embodiments of the present disclosure.
Figure 6B:
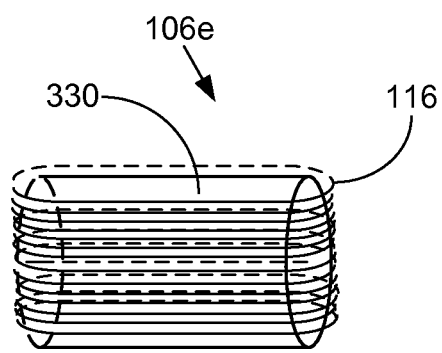
FIGS. 6B, 7B, 8B, 9B, 10B, and 11B are diagrams of a side view of a receiver including a coil support structure in accordance with embodiments of the present disclosure.
Figure 7A:
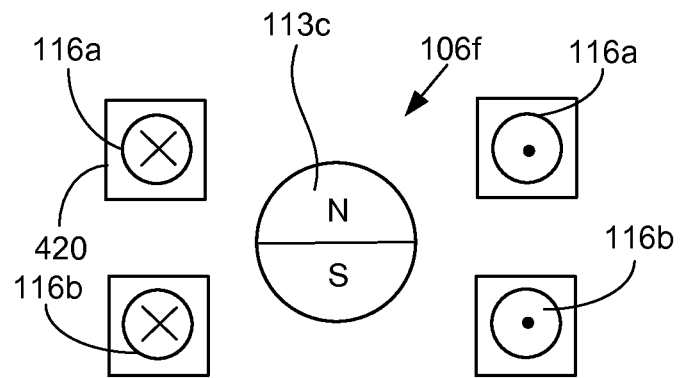
Figure 7B:
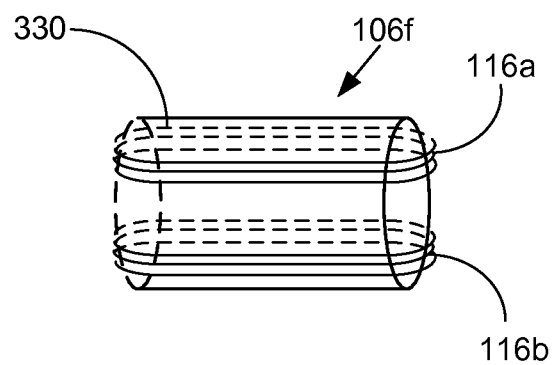
Figure 8A:
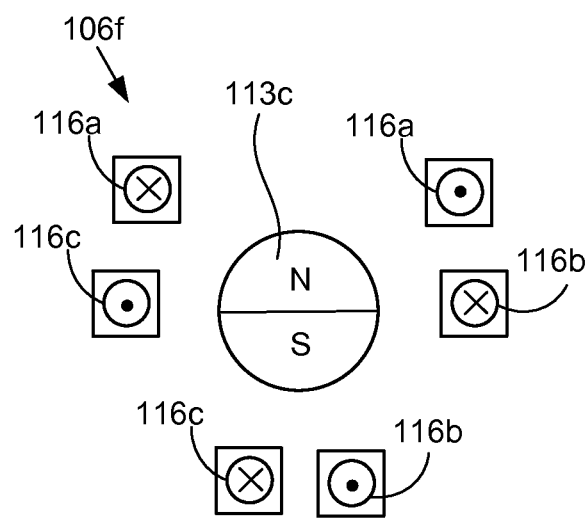
Figure 8B:
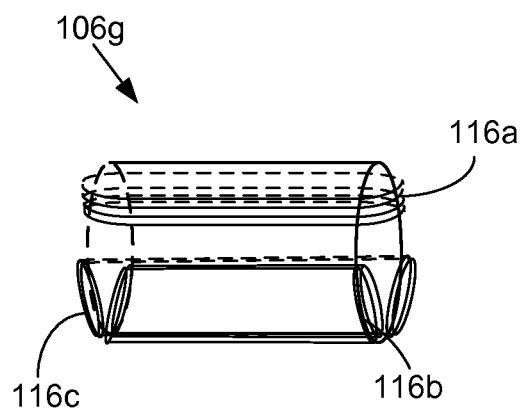

With reference to FIGS. 6A-6B, 7A-7B, and 8A-8B, shown are components that may be in a receiver 106 using a cylindrical magnet, according to various embodiments. In particular, FIGS. 6A, 7A, and 8A show cross sections of the components, and FIGS. 6B, 7B, and 8B are corresponding views of the components. The cylindrical magnet 113c, shown in FIGS. 6A-6B, 7A-7B, and 8A-8B is discussed above with respect to FIG. 4. Further, a magnet casing 330, fluid 355, and/or physical axle 210 may also be included in various embodiments in addition to the components shown in FIGS. 6A-6B, 7A-7B, and 8A-8B.

As shown in FIG. 6A, a receiver 106e may include a coil support structure 420. The coil support structure 420 is not shown in FIGS. 6B, 7A-7B, and 8A-8B for clarity. One or more coils 116 may be attached to the coil support structure 420, as will now be described.

In FIGS. 6A-6B, a single coil 116 with multiple windings is attached to the coil support structure 420. When the cylindrical magnet 113c is exposed to the dynamic magnetic field 109, the cylindrical magnet 113c rotates relative to the coil 116. As a result, a voltage is induced across the coil 116.

In FIGS. 7A-7B, two parallel coils 116a-116b are attached to the coil support structure 420 (not shown in FIGS. 7A-7B). When the cylindrical magnet 113c is exposed to the dynamic magnetic field 109, the cylindrical magnet 113c rotates relative to the coils 116a-116b. As a result, voltages are induced across the coils 116a-116b. There will be a phase difference between the voltage across the coil 116a and the voltage across the coil 116b.

In FIGS. 8A-8B, three coils 116a-116c are attached to the coil support structure 420 (not shown in FIGS. 8A-8B). In this embodiment, an angle of about 120° may be formed between respective coils 116a-116c, as shown in FIG. 8A, thereby forming a three-phase power generation scheme. It is understood that the angle between respective coils 116a-116c may be varied in alternative embodiments. When the cylindrical magnet 113c is exposed to the dynamic magnetic field 109, the cylindrical magnet 113c rotates relative to the coils 116a-116c. As a result, voltages are induced across the coils 116a-116c. There will be a phase difference of about 120° between the respective voltages.

Figure 9A:
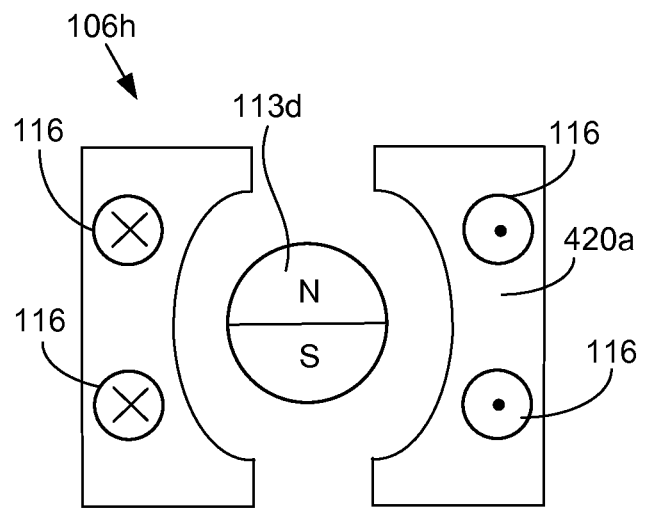
Figure 9B:
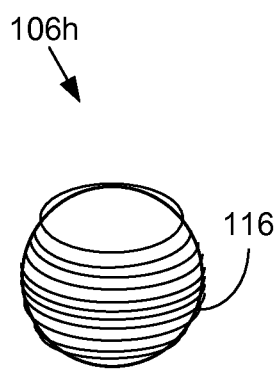
Figure 10A:
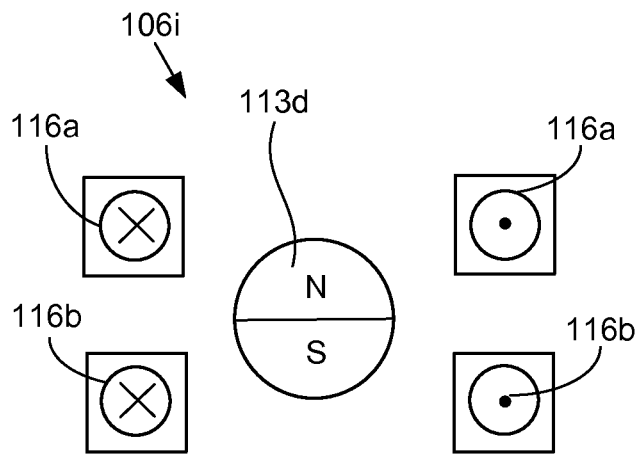
Figure 10B:
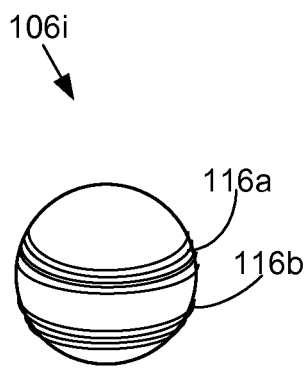
Figure 11A:
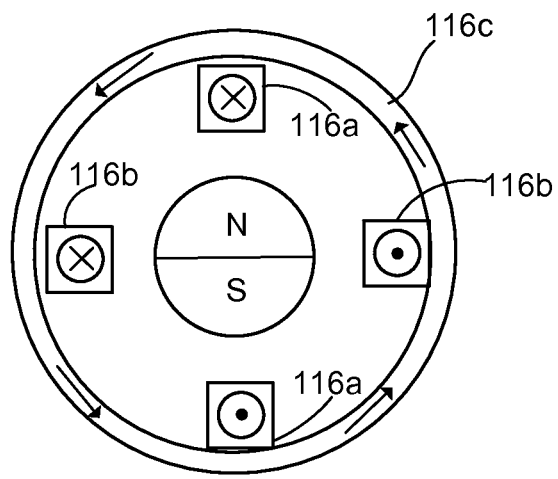
Figure 11B:
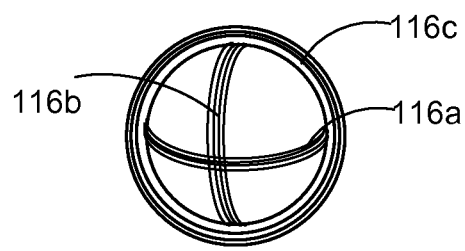

With reference to FIGS. 9A-9B, 10A-10B, and 11A-11B, shown are components that may be in a receiver 106 using a spherical magnet, according to various embodiments. In particular, FIGS. 9A, 10A, and 11A show cross sections of the components, and FIGS. 9B, 10B, and 11B are corresponding views of the components. The spherical magnet 113d shown in FIGS. 9A-9B, 10A-10B, and 11A-11B is discussed above with respect to FIG. 5. Further, a magnet casing 330, fluid 355, and/or physical axle 210 may also be included in various embodiments in addition to the components shown in FIGS. 9A-9B, 10A-10B, and 11A-11B.

As shown in FIG. 9A, a receiver 106h may include a coil support structure 420a. The coil support structure 420a is not shown in FIGS. 9B, 10A-10B, and 11A-11B for clarity. One or more coils 116 may be attached to the coil support structure 420a, as will now be described.

As shown in FIGS. 9A-9B, a single coil 116 with multiple windings is attached to the coil support structure 420a. When the spherical magnet 113d is exposed to the dynamic magnetic field 109, the spherical magnet 113d rotates relative to the coil 116. As a result, a voltage is induced across the coil 116.

As shown in FIGS. 10A-10B, two parallel coils 116a-116b are attached to the coil support structure 420a (not shown in FIGS. 10A-10B). When the spherical magnet 113d is exposed to the dynamic magnetic field 109, the spherical magnet 113d rotates relative to the coils 116a-116b. As a result, voltages are induced across the coils 116a-116b. There will be a phase difference between the voltage across the coil 116a and the voltage across the coil 116b.

In FIGS. 11A-11B, three coils 116a-116c are attached to the coil support structure 420 (not shown in FIGS. 11A-11B). In this embodiment, all of the coils 116a-116c are orthogonal relative to each other. When the spherical magnet 113d is exposed to the dynamic magnetic field 109, the spherical magnet 113d rotates relative to the coils 116a-116c. As a result, voltages are induced across the coils 116a-116c. There will be a phase difference between the respective voltages.

Figure 12:
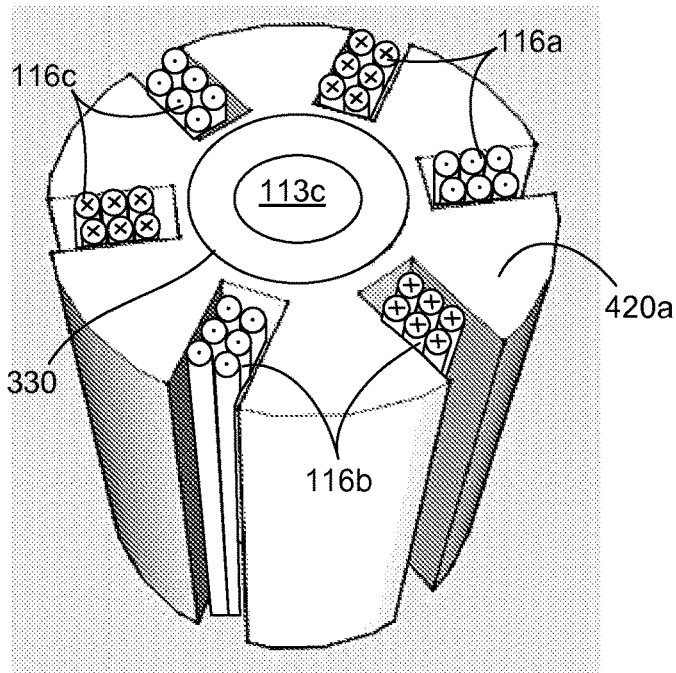
FIGS. 12-13 are diagrams of a perspective view of the coil support structure, the coils, the magnet casing, and the magnet of the receiver of FIG. 1 according to various embodiments.

With reference to FIG. 12, shown is a perspective view illustrating a cross section of the coil support structure 420a, the coils 116a-116c, the magnet casing 330, and the spherical magnet 113c according to various embodiments. The embodiment shown in FIG. 12 is the same embodiment shown in FIGS. 8A-8B.

As shown, the coil support structure 420a may include channels in which the respective coils 116a-116c are positioned. The coils 116a-116c in the embodiment shown are arranged so that the coils 116a-116c do not wrap over the ends of the magnet 113c and the magnet casing 330. Because the coils 116a-116c do not wrap around the ends of the magnet 113c and the magnet casing 330, the magnet 113c and the magnet casing 330 may be replaced without removing the coils 116a-116c from the coil support structure 420a. Thus, this embodiment may facilitate replacing the magnet 113c for various reasons.

Figure 13:
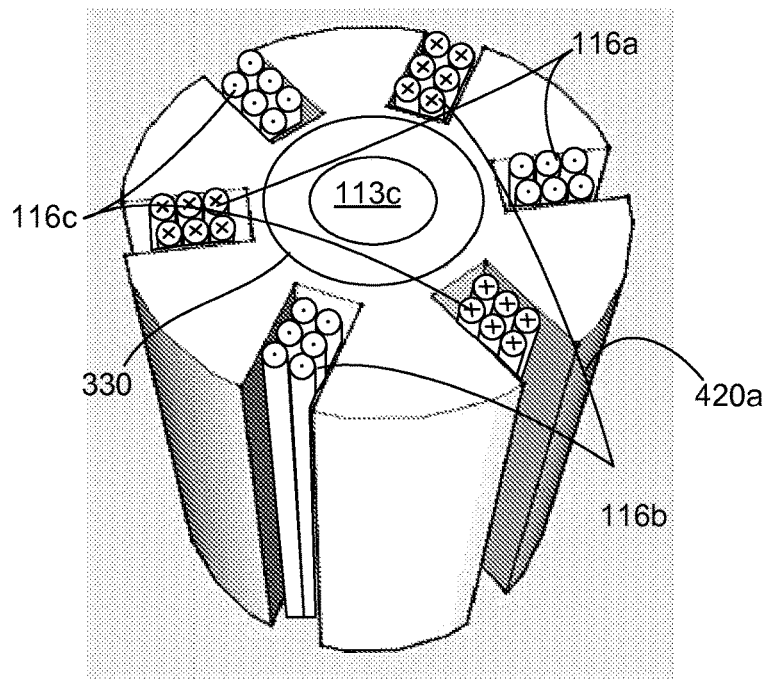

With reference to FIG. 13, shown is a perspective view illustrating a cross section of the coil support structure 420a, the coils 116a-116c, the magnet casing 330, and the magnet 113c according to various embodiments. The embodiment shown in FIG. 13 is similar to the embodiment shown in FIG. 12. However, the coils 116a-116c for the embodiment shown in FIG. 13 have a different arrangement from the embodiment of FIG. 13. In particular, the coils 116a-116c are disposed in the respective channels in the coil support structure 420a by being wound around the ends of the magnet 113c and the magnet casing 330. As such, the coils 116a-116c intersect at the ends of the magnet 113c and the magnet casing 330. When the magnet 113c rotates within the magnet casing 330, there will be a phase difference of about 120° between the voltages across the respective coils 116a-116c.

In an alternative embodiment, the magnet 113 and fluid 355 are directly inserted into a hole or cavity made in the coil support structure 420 without use of the magnet casing 330. In such an exemplary operation, a time-varying magnetic field emitted by a transmitter induces a magnetic torque onto the receiver magnet 113, causing it to spin and to supply power to an electrical load. Such receiver architecture is more compact and with fewer parts.

In a first series of tests, a power transfer environment that includes a coil-based transmitter 103 and a receiver system 106 featuring a permanent magnet rotor 113 that is allowed to rotate within receiver windings 116 is provided. The transmitter coil is a thin solenoid with ~112 turns of 15-AWG copper wire, having an outer diameter of 30 cm, an inner diameter of 25 cm, and a length of 12 mm (L=8.5 mH, R=1.3Ω). The receiver system 106 comprises a diametrically magnetized, cylindrical N42 grade Nd—Fe—B permanent magnet rotor 113 (K&J Magnetics, D36DIA, diameter=4.8 mm, length=9.5 mm) that rotates on a ferrofluid bearing 355 within a 3D-printed structure 420 (diameter=25 mm, length=30 mm) with slots for coil windings 116. In this configuration, the magnet 113 and ferrofluid 355 are held within a capped glass vial 330 and centered via two plastic inserts. The receiver 106 is wound with a single coil of 250 turns of 34-AWG copper wire 116.

To transmit power, an alternating current is injected into the transmitter coil, which results in the generation of a time-varying magnetic flux density B(t). When the receiver system 106 was placed nearby, the transmitted B-field applied an alternating torque that induced the synchronous rotation of the permanent magnet 113. The magnet motion produced a time-varying magnetic flux in the receiver windings 116, thereby inducing a voltage. Therefore, if an electrical load is connected to the two terminals of the receiver windings 116, power is delivered. Compared to a oscillating, resonant-based system, the rotating electrodynamic wireless power transmission (EWPT) system of the present disclosure has the potential to induce a larger variation of magnetic flux through the coil 116, since the magnet rotates 360° around its axis at the frequency set by the transmitter AC current. Additionally, the receiver 106 can operate across a large range of frequencies.

After placing the receiver system 106 at a certain distance from the transmitter 103, a fixed-amplitude 4 ARMS sinusoidal current is injected in the transmitter coil, corresponding to 18.4 W. The resistive load was adjusted to 22.5Ω to match the receiver windings resistance for maximum power transmission. The frequency was slowly increased from a low frequency, 40 Hz—where the receiver locked into synchronous, steady-state rotation—up to a point where the magnet lost synchronization with the transmitted B-field, resulting in no more magnet rotation. This upper frequency is called the maximal frequency and the output power at that frequency is called the maximal output power. The frequency where synchronization is lost represents the "pull out torque" for a synchronous machine—the point where the magnetic torque acting on the magnet 113 equals the sum of the opposing mechanical and magnetomotive torques.

Figure 14:
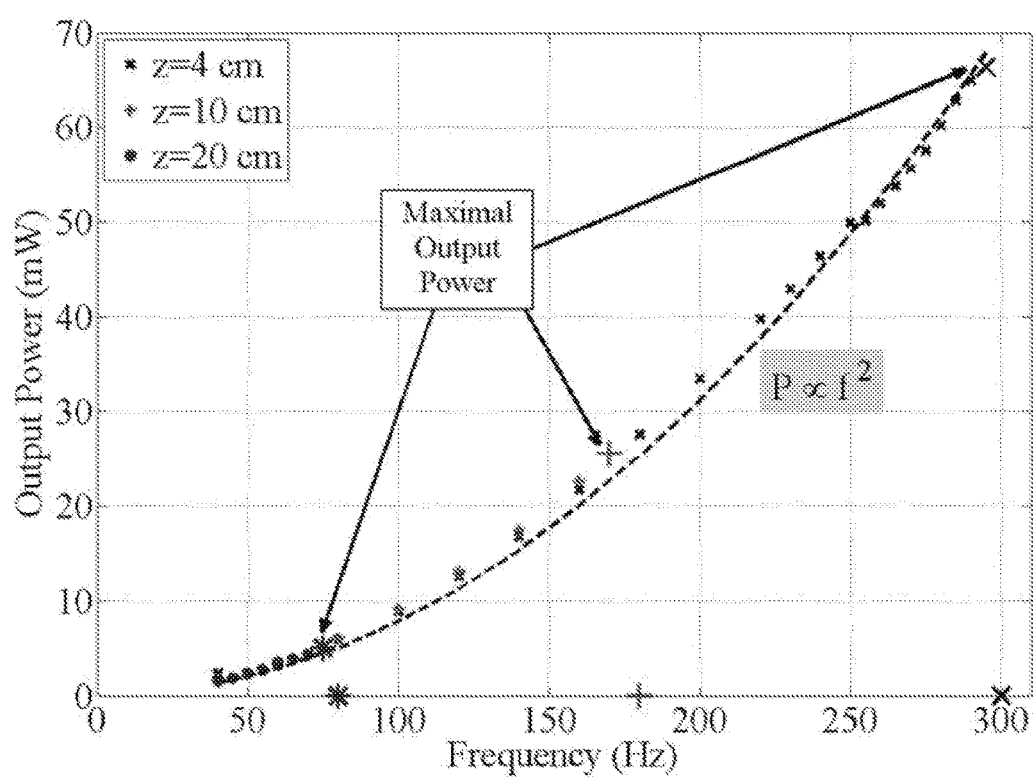
FIG. 14 is a diagram illustrating output power versus transmitter frequency for a transmitter-receiver configuration in accordance with embodiments of the present disclosure.

At a distance of z=4 cm between the center of the transmitter 103 and of the receiver 106, the output power was measured at representative frequencies, as illustrated in FIG. 14. The output power is observed to increase quadratically with the frequency (load voltage proportional to frequency), as expected with a synchronous machine, up to the maximum frequency of 295 Hz. This test was reproduced at several distances between transmitter 103 and receiver 106. The results obtained at z=10 cm and z=20 cm are also reported in FIG. 14. For a given frequency, the output power was found to be independent of the distance. However the maximal frequency (hence the maximal output power) was strongly dependent on the distance. The farther the receiver 106 was from the transmitter 103, the lower the magnetic field and the lower the maximum output power that is transmitted were reported. From testing, the maximum output power was 66.4 mW at z=4 cm, but the maximum output was only 5.1 mW at z=20 cm. Consequently, in this configuration, a 5-fold increase in distance resulted in only a 13-fold decrease in the maximal output power.

Figure 15:
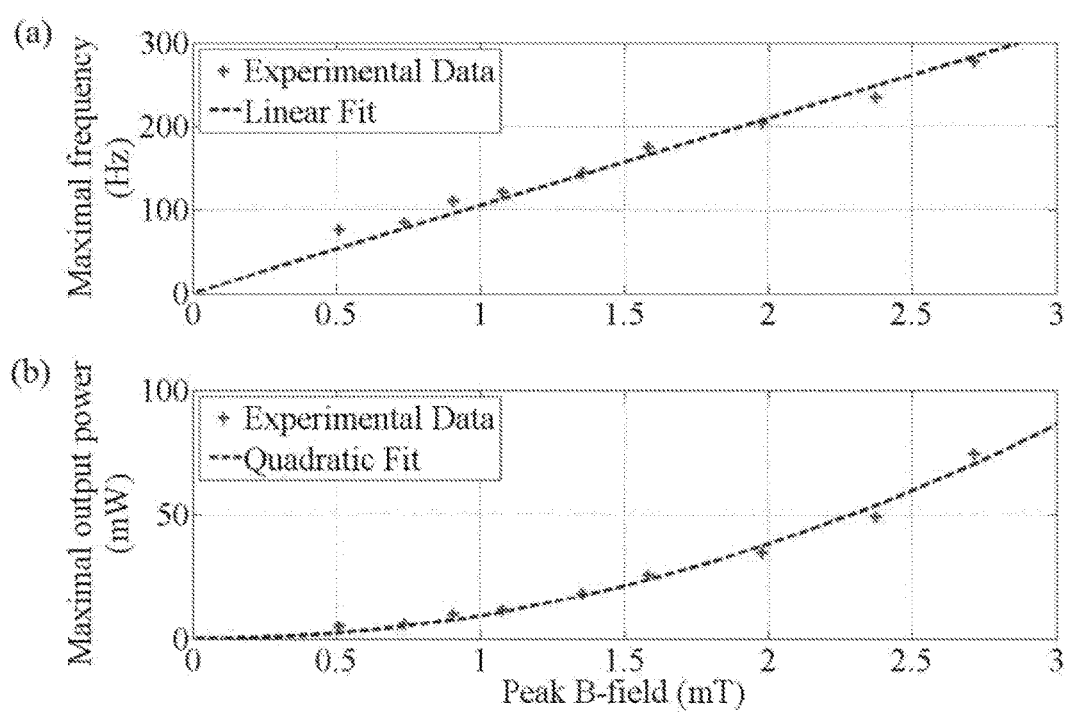
FIG. 15 is a diagram of plots A-B that illustrate maximal frequency and the maximal output power as a function of the peak B-field at the receiver location in accordance with embodiments of the present disclosure.

Keeping the transmitter current at 4 ARMS, the distribution of the B-field along the z-axis was measured next. Based on these measurements, the maximal frequency and the maximal output power were plotted as a function of the peak B-field, at discrete receiver locations along the z-axis. FIG. 15 summarizes the results in Plots A and B. In particular, a linear dependence was found between the maximal frequency and the transmitted B-field in Plot A. Consequently, the maximal output power was found to be quadratic with the B-field in Plot B. Based on these observations, for maximal power transfer, the B-field from the transmitter should be as high as possible to increase the maximal frequency (hence the maximal output power) as long as it remains within safety limits.

Figure 16:
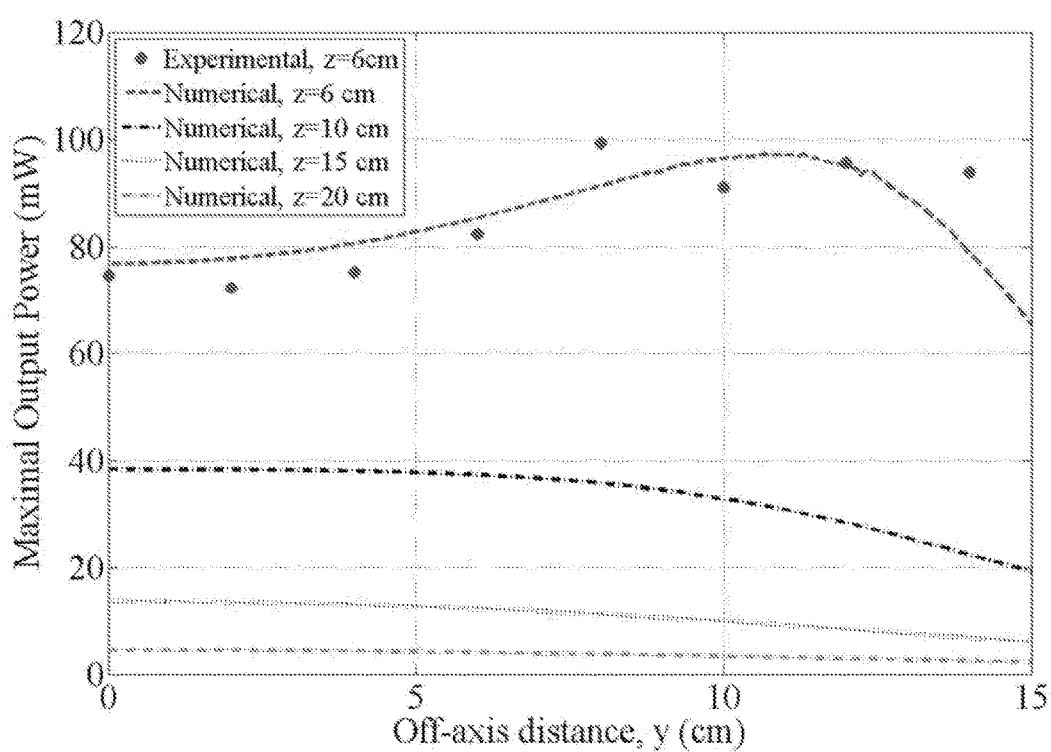
FIG. 16 is a diagram of maximal output power as a function of an off-axis distance in accordance with embodiments of the present disclosure.

Another capability for an exemplary EWPT system in accordance with embodiments of the present disclosure is off-axis power transmission. Due to symmetrical consideration, off-axis power was only measured for offsets in the positive y-axis during experimental testing. The receiver system 106 was first placed at a distance z=6 cm away from the transmitter 103, and the off-axis distance y was modified. The resulting maximal output power as a function of y is reported in FIG. 16. A maximal output power of 99 mW was measured at y=7 cm (z=6 cm). Numerical predictions of the expected output power levels at z=10 cm, z=15 cm, and z=20 cm are also plotted, based on the quadratic relationship with the peak B-field, found previously in FIG. 15. The numerical estimations indicate that a reasonable output power can still be received off-axis, up to 20 cm away from the transmitter 103.

To test the ability to power multiple receivers 106, three similar receiver systems 106 were placed in proximity to the transmitter 103. An embodiment of the EWPT system was shown to simultaneously power the three receivers 106 distributed in space with no apparent limitation on their relative positions. As a worst-case scenario, the three receiver systems 106 were placed one next to each other wherein maximum magnetic interaction could occur between the three receiver magnets. Even in this configuration, at a given frequency, each device 106 received roughly the same amount of power as if powered alone. However, the maximal frequency was found to be lower (~-30%), causing a decrease in the maximal output power compared to the alone-receiver case.

Experimental testing above shows a significant increase in the amount of power delivered to a resistive load, achieving up to 99 mW, with a power density up to 31 mW/cm$^3$. The system is shown capable of powering a receiver 106 off-axis from the transmitter 103, as well as powering multiple receivers 106 at the same time. The maximal output power is demonstrated to be quadratic with the transmitted B-field.

Figure 17:
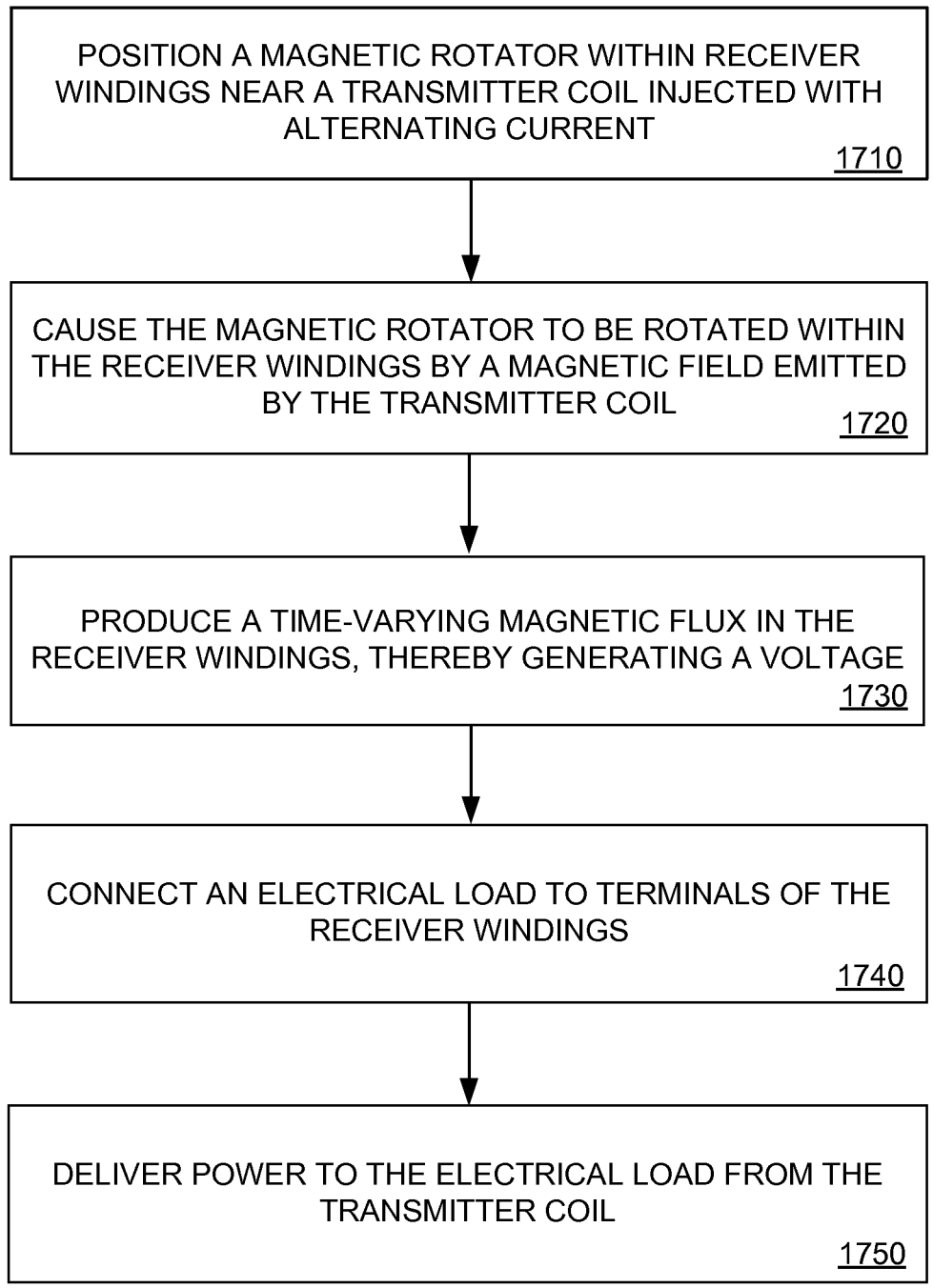
FIG. 17 is a flowchart diagram illustrating an embodiment of the operation of receiver of FIG. 1 in accordance with the present disclosure.

Referring now to FIG. 17, shown is a flowchart illustrating an embodiment (1900), among others, of the operation of an exemplar receiver 106 of the present disclosure. In block 1710, a magnetic rotator within receiver windings 116 is positioned near a transmitter coil injected with alternating current. A dynamic, time-varying magnetic field emitted by the transmitter coil induces a torque on the magnetic rotator causing (1720) it to be rotated within the receiver windings or coil 116. In one embodiment, the magnetic rotator comprises a magnet 113 and fluid 355 held within a magnetic casing 330 that is centered in a coil support structure 420 to which the receiver windings 116 are wound. The magnetic motion produces (1730) a time-varying magnetic flux in the receiver windings, thereby generating a voltage. After connecting (1740) an electrical load to terminals of the receiver windings, power is wirelessly delivered (1750) to the electrical load from the transmitter coil.

Next, during additional experimental testing, a second configuration of a power transfer environment is provided that includes a coil-based transmitter 103 and a receiver system 106 featuring a cylindrical Nd—Fe—B permanent magnet rotor 113 (diameter=4.8 mm, length=9.5 mm) that rotates in a ferrofluid bearing 355. Conductive AWG-34 windings 116 (250 turns) are wound within a 3D-printed structure with slots for coil windings forming a 2-pole synchronous-generator architecture. In this second configuration (D=23 mm, L=15 mm), the magnet 113 and ferrofluid 355 are held within a capped glass vial 330 and centered via plastic inserts. In a third smaller configuration (D=20 mm, L=10 mm), the magnet 113 and ferrofluid 355 are directly inserted into a hole made in a 3D-printed structure 420. In operation, a time-varying magnetic field emitted by the transmitter 103 induces a magnetic torque onto the receiver magnet 113, causing it to spin and to supply power to an electrical load.

Additionally, different transmitter designs between a simple coil, an electromagnet, and a pancake coil were explored to increase the B-field that leads to an output power increase. For the transmitter 103, a large pancake coil design, with backside magnetic shielding (0.36-mm thick MuMETAL sheet), resulted in larger B-fields than a simple coil transmitter design during testing. Moreover, modeling data showed a larger magnetic interaction volume for the pancake coil. With the electromagnet design, large B-fields were achieved for short distances.

Figure 18:
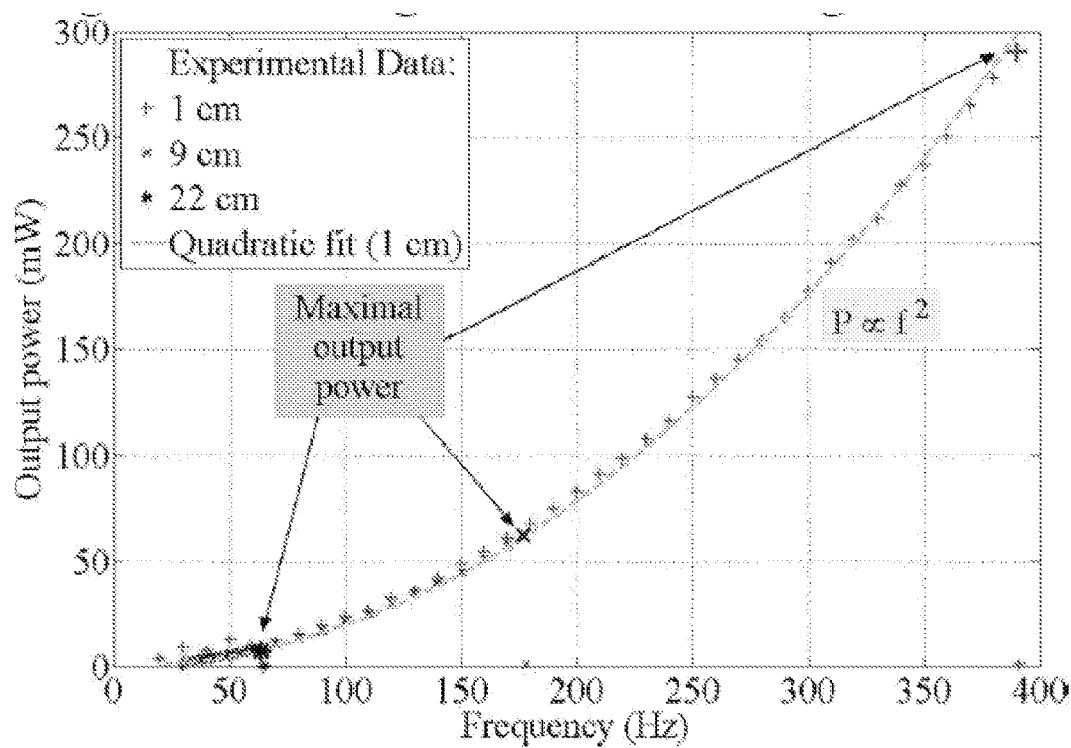
FIG. 18 is a diagram illustrating output power versus transmitter frequency for a transmitter-receiver configuration in accordance with embodiments of the present disclosure.
Figure 19:
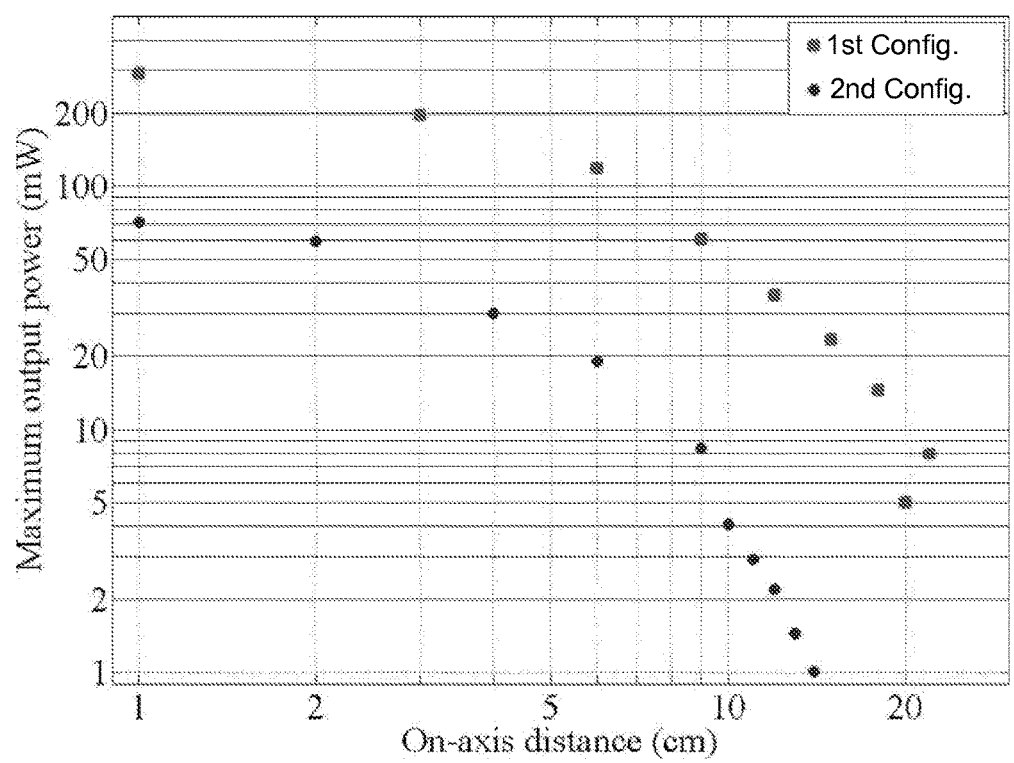
FIG. 19 is a diagram illustrating maximal output power for different receiver configurations in accordance with embodiments of the present disclosure.

Next, FIG. 18 shows the matched-load output power versus the transmitter frequency, for various distances between the transmitter 103 and receiver 106 for the second configuration of the receiver 106. From the testing data, a quadratic relationship is found between the output power and the frequency, as shown in the figure. At a given frequency, the output power is shown to not depend on the distance, but the maximal operating frequency (hence the maximal output power) depends strongly on the distance, as shown in FIG. 19 for the two other configurations. At (x,y)=(0.1 cm) (6.6-mTpeak B-field), the magnet spun up to 390 Hz with a maximum output power of 291 mW. Above this frequency, the magnet lost synchronization and ceased to rotate. For the third configuration of the receiver 106, the magnet rotated up to 447 Hz, with a maximal output power of 71 mW at 1 cm. Accordingly, the receiver 106 may be continued to be miniaturized in accordance with embodiments of the present disclosure Accordingly, embodiments of the present disclosure provide a new method of EWPT. In this approach, a transmitter 103 produces an alternating magnetic field that moves a permanent magnet 113 in a receiver 106, the motion of which generates a voltage in the receiver windings 116. If a load is connected to the receiver windings 116, EWPT is achieved. The electrodynamic coupling solution affords operation at much lower frequencies (e.g. 100's of Hz) than what is commonly used in inductively coupled wireless power transmission (WPT) (e.g. 0.1-100's of MHz). This low-frequency range of operation facilitates higher safety margins for magnetic field amplitudes and better penetration (less attenuation) through electrically conductive media. Therefore, exemplary embodiments of the EWPT method provides the opportunity to safely transmit power in crowded environments, such as a home, office space, automobile, or to an implanted biomedical device within the human body. Certain embodiments of the EWPT method also facilitate power transmission through salt water, for example for undersea applications. Compared to oscillating, resonant-type electrodynamic receiver(s), which only generated appreciable power when excited at their specific resonant frequencies, the rotational approach enables the receiver(s) to generate power across a wider frequency range of operation. This approach also enables much higher power transmission levels as well as simpler, more compact, and more reliable receiver construction.

As used herein, disjunctive language, such as the phrase "at least one of X, Y, or Z," unless specifically stated otherwise, is understood to present that an item, term, etc., may be either X, Y, or Z, or any combination thereof (e.g., X, Y, and/or Z). Thus, such disjunctive language should not imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a transmitter that generates a dynamic magnetic field; and
a receiver comprising a magnet, a magnet casing, and at least one coil wrapped around the magnet casing, wherein the magnet is configured to rotate 360 degrees around its axis within the magnet casing without need for a physical axle in response to the dynamic magnetic field, wherein the rotating magnet produces a time-varying magnetic flux that induces a voltage across the at least one coil.

2. The system of claim 1, wherein:
the transmitter is among a plurality of transmitters that generate a plurality of dynamic magnetic fields; and
the magnet rotates in response to the plurality of dynamic magnetic fields.

3. The system of claim 1, wherein:
the receiver is among a plurality of receivers that comprise a plurality of magnets and a plurality of coils; and
the plurality of magnets rotate in response to the dynamic magnetic field.

4. The system of claim 1, wherein the transmitter comprises at least one of a multi-turn coil, a solenoid, or a figure-eight coil.

5. The system of claim 1, wherein the transmitter comprises a rotating permanent magnet.

6. The system of claim 1, wherein the transmitter comprises a rotating coil.

7. The system of claim 1, wherein the transmitter comprises an electromagnet.

8. The system of claim 1, wherein the dynamic magnetic field operates at a constant frequency.

9. The system of claim 1, wherein a frequency for the dynamic magnetic field varies so as to change the rotation of the magnet.

10. The system of claim 9, wherein the frequency for the dynamic magnetic field increases over time during a ramp up period.

11. The system of claim 1, wherein the magnet comprises a multipole magnet.

12. The system of claim 1, wherein the magnet comprises a spherical magnet, a cylindrical magnet, or any other volume of revolution.

13. The system of claim 1, wherein the magnet casing contains at least one of ferrofluid, water, oil, or a gas.

14. The system of claim 1, wherein the at least one coil comprises a first coil for a first hemisphere of the magnet casing that contains the magnet and a second coil for a second hemisphere of the magnet casing that contains the magnet.

15. The system of claim 1, wherein the at least one coil is for both a first hemisphere and a second hemisphere of the magnet casing that contains the magnet.

16. The system of claim 1, wherein the at least one coil is among a plurality of coils, and wherein all the coils are orthogonal relative to each other.

17. The system of claim 1, wherein the at least one coil is among a plurality of coils attached to a coil support structure that wraps around the magnet casing, and wherein the plurality of coils form a multi-phase coil system.

18. A method, comprising:
positioning a receiver in a dynamic magnetic field that is generated by a transmitter, wherein the receiver comprises a magnet, a magnet casing, and a coil wrapped around the magnet casing;
rotating the magnet 360 degrees around its axis within the magnet casing without need for a physical axle responsive to the dynamic magnetic field; and
generating a voltage across the coil in the receiver in response to the rotating magnet.

19. The method of claim 18, wherein the dynamic magnetic field comprises a constant frequency.

20. The method of claim 18, wherein a frequency for the dynamic magnetic field varies so as to change the rotation of the magnet.

21. The method of claim 20, wherein the frequency for the dynamic magnetic field increases over time during a ramp up period.

22. The method of claim 21, wherein the ramp up period is repeated periodically.

23. The method of claim 18, wherein a frequency for the dynamic magnetic field is less than 10 kHz.

24. The method of claim 18, wherein a frequency for the dynamic magnetic field is less than 1 kHz.

25. The method of claim 18, wherein a frequency for the dynamic magnetic field is less than 100 Hz.

26. The system of claim 1, wherein the magnet comprises a spherical magnet, and the magnet casing comprises a spherical magnet casing within which the spherical magnet is capable of orienting itself with an axis of the dynamic magnetic field.

27. The system of claim 26, wherein the magnet casing contains at least one of ferrofluid, water, oil, or a gas.

28. The system of claim 26, wherein the at least one coil is among a plurality of coils, and wherein all the coils are orthogonal relative to each other.

29. The system of claim 1, wherein a direction of magnetization is perpendicular or approximately perpendicular to the axis of rotation of the magnet.

30. The method of claim 18, wherein the magnet comprises a spherical magnet, and the magnet casing comprises a spherical magnet casing within which the spherical magnet is capable of orienting itself with an axis of the dynamic magnetic field.

31. The method of claim 30, wherein the magnet casing contains at least one of ferrofluid, water, oil, or a gas.

32. The method of claim 30, wherein the coil is among a plurality of coils, and wherein all the coils are orthogonal relative to each other.

33. The method of claim 18, wherein a direction of magnetization is perpendicular or approximately perpendicular to the axis of rotation of the magnet.

* * * * *